US012737989B2

(12) United States Patent
Fox et al.

(10) Patent No.: US 12,737,989 B2
(45) Date of Patent: Sep. 15, 2026

(54) DYNAMIC METAVERSE NAVIGATIONAL INSERTION

(71) Applicant: INTERNATIONAL BUSINESS MACHINES CORPORATION, Armonk, NY (US)

(72) Inventors: Jeremy R. Fox, Georgetown, TX (US); Grant Douglas Miller, Arvada, CO (US); Lexi Reicks, Mountain View, TX (US); Sarah Lerner, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 18/047,010

(22) Filed: Oct. 17, 2022

(65) Prior Publication Data

US 2024/0127544 A1 Apr. 18, 2024

(51) Int. Cl.

*G06T 19/00* (2011.01)
*G06T 7/60* (2017.01)
*G06T 19/20* (2011.01)
*G06V 10/74* (2022.01)

(52) U.S. Cl.

CPC .............. *G06T 19/003* (2013.01); *G06T 7/60* (2013.01); *G06T 19/20* (2013.01); *G06V 10/761* (2022.01); *G06T 2219/2004* (2013.01)

(58) Field of Classification Search

CPC ......... G06T 19/003; G06T 7/60; G06T 19/20; G06T 2219/2004; G06V 10/761

See application file for complete search history.

(56) References Cited

U.S. PATENT DOCUMENTS

| | | | |
|---|---|---|---|
| 9,235,319 | B2 | 1/2016 | Finn et al. |
| 10,533,850 | B2 | 1/2020 | Abovitz et al. |
| 2004/0143852 | A1 | 7/2004 | Meyers |
| 2009/0175559 | A1 | 7/2009 | Hamilton et al. |
| 2009/0288002 | A1 | 11/2009 | Hamilton et al. |

(Continued)

OTHER PUBLICATIONS

Screen capture from YouTube video clip entitled "roblox gameplay", uploaded on Jul. 7, 2017 by user "Roblox Kid". Retrieved from Internet: <https://www.youtube.com/watch?v=VdM79tx00jA>. (Year: 2017).*

(Continued)

*Primary Examiner* — Kee M Tung
*Assistant Examiner* — David W Soon
(74) *Attorney, Agent, or Firm* — Cantor Colburn LLP; Kelsey M. Skodje

(57) ABSTRACT

A computer-implemented method for virtual space insertion is provided. The computer-implemented method includes receiving first and second user inputs from users regarding user information and regarding a virtual space targeted for entry by each of the users, respectively, obtaining spatial and occupancy information of the virtual space, determining insertion point requirements for the entry of each of the users into the virtual space from the first user inputs, generating a self-similar geometric insertion point pattern compatible with the insertion point requirements to a first threshold and with the spatial and occupancy information to a second threshold and mapping an insertion point for the entry of each of the users into the virtual space to the self-similar geometric insertion point pattern.

16 Claims, 5 Drawing Sheets

(56) References Cited

U.S. PATENT DOCUMENTS

| | | | | |
|---|---|---|---|---|
| 2013/0311361 | A1 | 11/2013 | Boss et al. | |
| 2017/0329394 | A1 | 11/2017 | Goldstein et al. | |
| 2022/0286363 | A1 * | 9/2022 | Decrop | H04W 24/02 |

OTHER PUBLICATIONS

Roblox Dev Forum post entitled "Possible to make players join specfic server" 5 pages, posted Aug. 2019 by user "0Shank". Retrieved from Internet: <https://devforum.roblox.com/t/possible-to-make-players-join-specfic-server/335985/7>. (Year: 2019).*

Meta, "We believe in the future of connection in the metaverse", available online at <https://www.meta.com/en-gb/metaverse/?utm_source=about.facebook.com&utm_medium=redirect>, May 2022, 10 pages.

No Author, "Absolute value", https://web.archive.org/web/20220810153214/https://simple.wikipedia.org/wiki/Absolute_value, Jan. 15, 2022, 3 pages.

No Author, "Chaos theory", https://web.archive.org/web/20250502033010/https://en.wikipedia.org/wiki/Chaos_theory, Apr. 9, 2025, 35 pages.

No Author, "Complement (set theory)", https://web.archive.org/web/20220618075147/https://en.wikipedia.org/wiki/Complement_(set_theory), Jun. 7, 2022, 6 pages.

No Author, "Complex dynamics", https://web.archive.org/web/20220616094633/https://en.wikipedia.org/wiki/Complex_dynamics, Jun. 9, 2022, 3 pages.

No Author, "Complex number", https://web.archive.org/web/20220120084358/https://simple.wikipedia.org/wiki/Complex_number, May 28, 2021, 3 pages.

No Author, "Function (mathematics)", https://web.archive.org/web/20220616141354/https://en.wikipedia.org/wiki/Function_(mathematics), Jun. 3, 2022, 25 pages.

No Author, "Helge von Koch", https://web.archive.org/web/20250000000000*/https://en.wikipedia.org/wiki/Helge_von_Koch, Mar. 28, 2022, 3 pages.

No Author, "Integer", https://web.archive.org/web/20220712095000/https://simple.wikipedia.org/wiki/Integer, Jun. 18, 2022, 2 pages.

No Author, "Iterated function", https://web.archive.org/web/20220605123543/https://en.wikipedia.org/wiki/Iterated_function, May 30, 2022, 13 pages.

No Author, "Julia Set", https://web.archive.org/web/20220617063256/https://en.wikipedia.org/wiki/Julia_setm, Jan. 30, 2022, 15 pages.

No Author, "Natural number", https://web.archive.org/web/20220609064724/https://simple.wikipedia.org/wiki/Natural_number, Nov. 3, 2021, 3 pages.

No Author, "Perturbation theory", https://web.archive.org/web/20220107014447/https://en.wikipedia.org/wiki/Perturbation_theory, Nov. 6, 2021, 7 pages.

No Author, "Positive number", https://web.archive.org/web/20220608143319/https://simple.wikipedia.org/wiki/Positive_number, Jun. 1, 2021, 1 page.

Wikipedia, "Euclidean space", available online at <https://en.wikipedia.org/w/index.php?title=Euclidean_space&oldid=1029770985>, Jun. 21, 2021, 15 pages.

Wikipedia, "Hausdorff dimension", available online at <https://en.wikipedia.org/w/index.php?title=Hausdorff_dimension&oldid=1035444010>, Jul. 25, 2021, 8 pages.

Wikipedia, "Lebesgue covering dimension", available online at <https://en.wikipedia.org/w/index.php?title=Lebesgue_covering_dimension&oldid=1022952866>, May 13, 2021, 4 pages.

Wikipedia, "Mathematics", available online at <https://en.wikipedia.org/w/index.php?title=Mathematics&oldid=5098591>, Aug. 8, 2004, 7 pages.

Wikipedia, "Measure (mathematics)", available online at <https://en.wikipedia.org/w/index.php?title=Measure_(mathematics)&oldid=1031854064>, Jul. 4, 2021, 7 pages.

Wikipedia, "Menger sponge", available online at <https://en.wikipedia.org/w/index.php?title=Menger_sponge&oldid=1085455902>, Apr. 30, 2022, 7 pages.

Wikipedia, "Self-similarity", available online at <https://en.wikipedia.org/w/index.php?title=Self-similarity&oldid=952854546>, Apr. 24, 2020, 5 pages.

Anderson, "2022 Virtual Career Fair: Hired in the Metaverse by Hirect" Career Karma, 2021; 6p.

Carnegie, "These Companies Are Already Living inZuckerberg's Metaverse", Wired.com, Nov. 2, 2021, 10p.

Cnet, youtube, [online]; "Watch Mark Zuckerberg's Metaverse AI Presentation in Less Than 10 Minutes" [retrieved on Sep. 27, 2022]; retrieved from the Internethttps://www.youtube.com/watch?v=Rncz85tVt5I.

Dayz, "Selectable Spawn Points," Bohemia Interactive ;2012, 17p.

Jones, "I went to a metaverse recruitment fair with 30 companies and 200 attendees. The avatars were creepy but I liked it—take a look around." Insider, Feb. 26, 2022, 24p.

Josephs, "Disney appoints executive to oversee metaversestrategy", BBC business, Feb. 16, 2022, 13p.

Netplay, "PlanetCraft and Planet of Cubes Forum", 2013/2022 PlanetCraft & PoC Fans, 5p.

Shiffman, "The Nature of Code", Chapter 8, Fractals, published 2012, 39p.

Sinha, "Top 10 Companies Working on Metaverse and Its Developments in 2022", 2022 Analytics Insight, 4p.

Stack-Exchange, "How to spawn enemies within a minimum distance of each other randomly? 2D", 2022 Stack Exchange Inc; 5p.

Stack-Exchange, "Making random spawn points fair?", https://gamedev.stackexchange.com/questions/146409/making-random-spawn-points-fair ; accessed 2022, 17p.

Wikipedia, "Fractal", retreived Sep. 27, 2022, 22p.

Wikipedia, "Koch snowflake", retreived Sep. 27, 2022, 11p.

Wikipedia, "Mandelbrot set", retreived Sep. 27, 2022, 2p.

* cited by examiner

DYNAMIC METAVERSE NAVIGATIONAL INSERTION

BACKGROUND

The present invention generally relates to metaverse navigation, and more specifically, to dynamic metaverse navigational insertion based on contextual cohort aggregation of geometric waypoint infusion.

The metaverse is a hypothetical iteration of the Internet as a single, universal and immersive virtual world that is facilitated by the use of virtual reality (VR) and augmented reality (AR) headsets. In colloquial use, a metaverse is a network of 3D virtual worlds focused on social connection.

SUMMARY

Embodiments of the present invention are directed to a computer-implemented method for virtual space insertion. A non-limiting example of the computer-implemented method includes receiving first and second user inputs from users regarding user information and regarding a virtual space targeted for entry by each of the users, respectively, obtaining spatial and occupancy information of the virtual space, determining insertion point requirements for the entry of each of the users into the virtual space from the first user inputs, generating a self-similar geometric insertion point pattern compatible with the insertion point requirements to a first threshold and with the spatial and occupancy information to a second threshold and mapping an insertion point for the entry of each of the users into the virtual space to the self-similar geometric insertion point pattern.

Embodiments of the present invention are directed to a computer program product for virtual space insertion. A non-limiting example of the computer program product includes one or more computer readable storage media having computer readable program code collectively stored on the one or more computer readable storage media. The computer readable program code is executed by a processor of a computer system to cause the computer system to perform a method including receiving first and second user inputs from users regarding user information and regarding a virtual space targeted for entry by each of the users, respectively, obtaining spatial and occupancy information of the virtual space, determining insertion point requirements for the entry of each of the users into the virtual space from the first user inputs, generating a self-similar geometric insertion point pattern compatible with the insertion point requirements to a first threshold and with the spatial and occupancy information to a second threshold and mapping an insertion point for the entry of each of the users into the virtual space to the self-similar geometric insertion point pattern.

Embodiments of the invention are directed to a computing system. The computing system includes a processor, a memory coupled to the processor and one or more computer readable storage media coupled to the processor. The one or more computer readable storage media collectively contain instructions that are executed by the processor via the memory to implement a method including receiving first and second user inputs from users regarding user information and regarding a virtual space targeted for entry by each of the users, respectively, obtaining spatial and occupancy information of the virtual space, determining insertion point requirements for the entry of each of the users into the virtual space from the first user input, generating a self-similar geometric insertion point pattern compatible with the insertion point requirements to a first threshold and with the spatial and occupancy information to a second threshold and mapping an insertion point for the entry of each of the users into the virtual space to the self-similar geometric insertion point pattern.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, within the metaverse or any virtual reality-based environment, users' avatars must occupy a certain "space." Nevertheless, it is often the case that user avatars are injected into a common space at a common injection point. For example, within a virtual job fair, user avatars are typically inserted into the virtual lobby or the virtual entrance (as in real life). This approach results in a virtual lobby or entrance quickly filling to capacity whereupon the environment closes or becomes overwhelmed with people. This would manifest, in some cases, as a confusing mass of collocated avatars that a user of a given avatar cannot easily navigate through.

Turning now to an overview of the aspects of the invention, one or more embodiments of the invention address shortcomings of the above-described approach by inserting user avatars within a digital or virtual reality-based space system for optimized social collaboration. Utilizing self-similar or fractal generators, a driver for insertion placement into the digital or virtual reality-based space (e.g., the metaverse) can be derived.

The above-described aspects of the invention address the shortcomings of known approaches by deriving a systematic manner of inserting a large cohort of user avatars into a given virtual or digital space (hereinafter referred to as a "virtual space") within a short period of time. This is done utilizing self-similar or fractal geometry whereby self-similar or fractal geometry generators effectively define insertion points in the virtual space for each user avatar. Decisions about how to define those insertion points for each user avatar will be based on various factors including, but not limited to, the virtual corpus of each user avatar, the ecosystem of the targeted virtual space and user preferences. The insertion points can be temporary waypoints or singular injection points.

Figure 1:
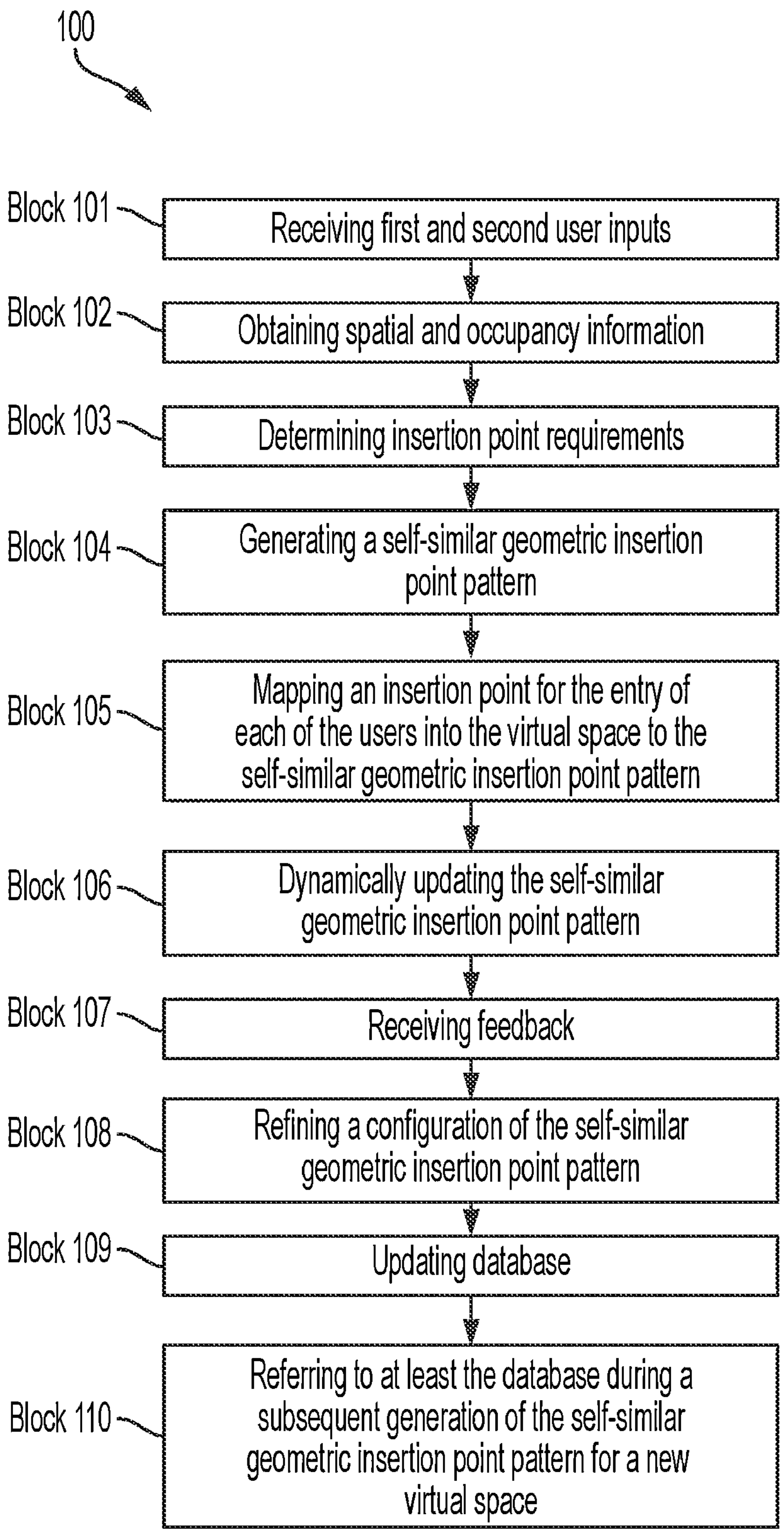
FIG. 1 is a flow diagram illustrating computer-implemented method for virtual space insertion in accordance with one or more embodiments of the present invention.

Turning now to a more detailed description of aspects of the present invention, FIG. 1 depicts a computer-implemented method 100 for virtual space insertion according to one or more embodiments of the invention. The computer-implemented method 100 is performed by the computing environment 700 (shown in FIG. 7). As shown in FIG. 1, the computer-implemented method 100 includes receiving first and second user inputs from users regarding user information and regarding a virtual space targeted for entry by an avatar of each of the users, respectively at block 101, obtaining spatial and occupancy information of the virtual space at block 102, and determining insertion point requirements for the entry of the avatar of each of the users into the virtual space from the first user inputs at block 103. In addition, the computer-implemented method 100 includes generating a self-similar geometric insertion point pattern compatible with the insertion point requirements to a first threshold and with the spatial and occupancy information to a second threshold at block 104 and mapping a unique insertion point for the entry of each of the users into the virtual space to the self-similar geometric insertion point pattern at block 105.

The user information for each of the users can include at least one or more of user data and/or user metadata for each of the users (i.e., user identification, user image, user account information, user social network information, etc.), insertion point pitch preferences for each of the users (i.e., how crowded a location in a virtual space should be for the avatar of the user to be inserted at or around that location), distance or proximity preferences with respect to insertion points of other users for each of the users (i.e., how far the user's avatar at the user's insertion point should be from avatars of other users and/or avatars located at other users' insertion points), distance or proximity preferences with respect to insertion points of specified users for each of the users (i.e., how close the user's avatar at the user's insertion point should be to insertion points of avatars of friends/business partners/acquaintances of the user) and positional preferences with respect to the virtual space and sub-sections of the virtual space for each of the users (i.e., how close a user's avatar at the user's insertion point should be to a location or a sub-location of particular interest to the user within a virtual space). The spatial information of the virtual space can include shape and dimension information of the virtual space. The occupancy information can describe a number of avatars of users present in the virtual space and concentrations of those avatars of users in the virtual space.

The virtual space targeted for entry by an avatar each of the users can be any bounded or unbounded virtual space in any virtual world including, but not limited to, the metaverse, second life, massive multi-player role playing games, etc. The virtual space can include a topography and structural features deployed on the topography. In cases where the virtual space is bounded, the virtual space can have a defined geometry with length, width and height and can be accessible to the avatars of the users at any time or only at specific times. In some cases where the virtual space is bounded, occupancy limits can be established to prevent the virtual space from becoming excessively crowded. For example, in a case of a virtual technology expo, the virtual space can be substantially rectangular and flat with various presenter kiosks displayed therein. This virtual technology expo might only be accessible to avatars of users at a given time, such as during business hours, and can have an established occupancy limit that allows users to easily navigate their avatars among the kiosks.

The determining of the insertion point requirements for the entry of each of the users into the virtual space from the first user inputs at block 103 can be executed, for example, by compiling the user information for each of the users from the first user inputs and then processing the user information into usable forms (i.e., by prioritizing certain user information and discarding or overriding other user information). That is, in the example of the virtual technology expo, user information might indicate that avatars of users who are business associates need to be kept together whereas user information of one of those users might indicate that his/her avatar needs a remote insertion point unless otherwise indicated. In such a case, the user information can be processed such that, for the entry of each of the users into the virtual technology expo, the insertion points of the avatars of the users are required to be proximate or adjacent one another with the user information of the one user being discarded or overridden.

In accordance with one or more embodiments of the present invention, the self-similar geometric insertion point pattern can include or be provided as a fractal geometry. As used herein, a fractal geometry is a self-similar subset of Euclidean space whose fractal dimension strictly exceeds its topological dimension. Self-similar geometries or fractals appear the same at different levels, as illustrated in successive magnifications of the Mandelbrot set for example. The exhibition of similar patterns at increasingly small scales in self-similar geometry and fractals is commonly referred to as "self-similarity" though it can also be known as expanding symmetry or unfolding symmetry.

In the generating of the self-similar geometric insertion point pattern at block 104, the first threshold is a ratio of actual and perfect compatibilities between the self-similar geometric insertion point pattern and the insertion point requirements and the second threshold is a ratio of actual and perfect compatibilities between the self-similar geometric insertion point pattern and the spatial and occupancy information. The first and second thresholds can both be predefined by a user or administrator and can be updated before, during or after an execution of the computer-implemented method 100. The first and second thresholds are provided to allow for execution of the generating of the self-similar geometric insertion point pattern at block 104 even if some of the insertion point requirements are not filled or the self-similar geometric insertion point pattern does not exactly or precisely match with the spatial and occupancy information.

In accordance with embodiments, the generating of the self-similar geometric insertion point pattern at block 104 can be executed by an insertion point self-similar geometry or fractal generator. This generator can be included in or connected to a computing device to be described below.

The mapping of the unique insertion point for the entry of each of the users into the virtual space to the self-similar geometric insertion point pattern at block 105 can be executed during or following the generating of the self-similar geometric insertion point pattern at block 104. In an exemplary case, once the self-similar geometric insertion point pattern has been selected and generated (i.e., based partly on user data/metadata as described above), the insertion points for the avatars of each of the users will be executed based on various factors including, but not limited to, a size and complexity of the self-similar geometric insertion point pattern and a number of avatars of the users to be inserted into the self-similar geometric insertion point pattern. Insertion point executions can be provided as at least one or more of the following: a singular iteration insertion in which a one-time insertion of a user set or cohort into a virtual environment/ecosystem is executed based on a single insertion point requirement; defined multiple iteration insertion(s) in which multiple planned (defined and fixed) insertions with similar requirements are executed with a defined end point; and recursive (temporal) time-boxed insertions in which a number of insertions are executed at specified time intervals prior to a large event.

With continued reference to FIG. 1, the computer-implemented method 100 can further include dynamically updating the self-similar geometric insertion point pattern as the users enter and exit the virtual space at block 106. The computer-implemented method 100 can also include receiving user feedback regarding the unique insertion point for the entry of the user into the virtual space at block 107, refining a configuration of the self-similar geometric insertion point pattern in accordance with the user feedback at block 108, updating a database associating the configuration of the self-similar geometric insertion point pattern with the virtual space at block 109 and referring to at least the database during a subsequent generation of the self-similar geometric insertion point pattern for a new virtual space, which is similar to the virtual space at block 110.

As to the dynamically updating of the self-similar geometric insertion point pattern as the users enter and exit the virtual space at block 206, it is to be understood that the self-similar geometric insertion point pattern can be enlarged or contracted to the extent that a compatibility of the self-similar geometric insertion point pattern with the virtual space is maintained. In the case of enlargement of the self-similar geometric insertion point pattern, this can be done as numbers of avatars of users increase within the virtual space and avoids a need for adjusting a pitch or density of the self-similar geometric insertion point pattern. Alternatively, a pitch or density of the self-similar geometric insertion point pattern can be increased to accommodate increasing numbers of avatars of users in cases in which enlarging the self-similar geometric insertion point pattern is not feasible (i.e., given a size limit of the virtual space).

When an avatar of a user is removed from the virtual space, a gap in the self-similar geometric insertion point pattern that can be filled may be left. This gap can be used as space and repurposed as an insertion point. This can remove the need for contracting the self-similar geometric insertion point pattern which could lead to increased re-rendering requirements. On the other hand, when the self-similar geometric insertion point pattern is expanded, if there are no empty (or vacated) insertion points, the self-similar geometric insertion point pattern can be expanded on the perimeter to reduce re-rendering. In a similar manner, as a user moves throughout the space, if they occupy an insertion point where another user was planned to be added, the insertion point can be dynamically re-assigned as needed. In the case where a user may need to be re-assigned an insertion point multiple times, such as for a very large event, to minimize the added waiting time their priority within the system can be temporarily increased with each retry. This would continue until either the insertion into a vacated space is successful, or a retry limit is exceeded and the expansion of the virtual space would be automatically triggered.

Figure 2:
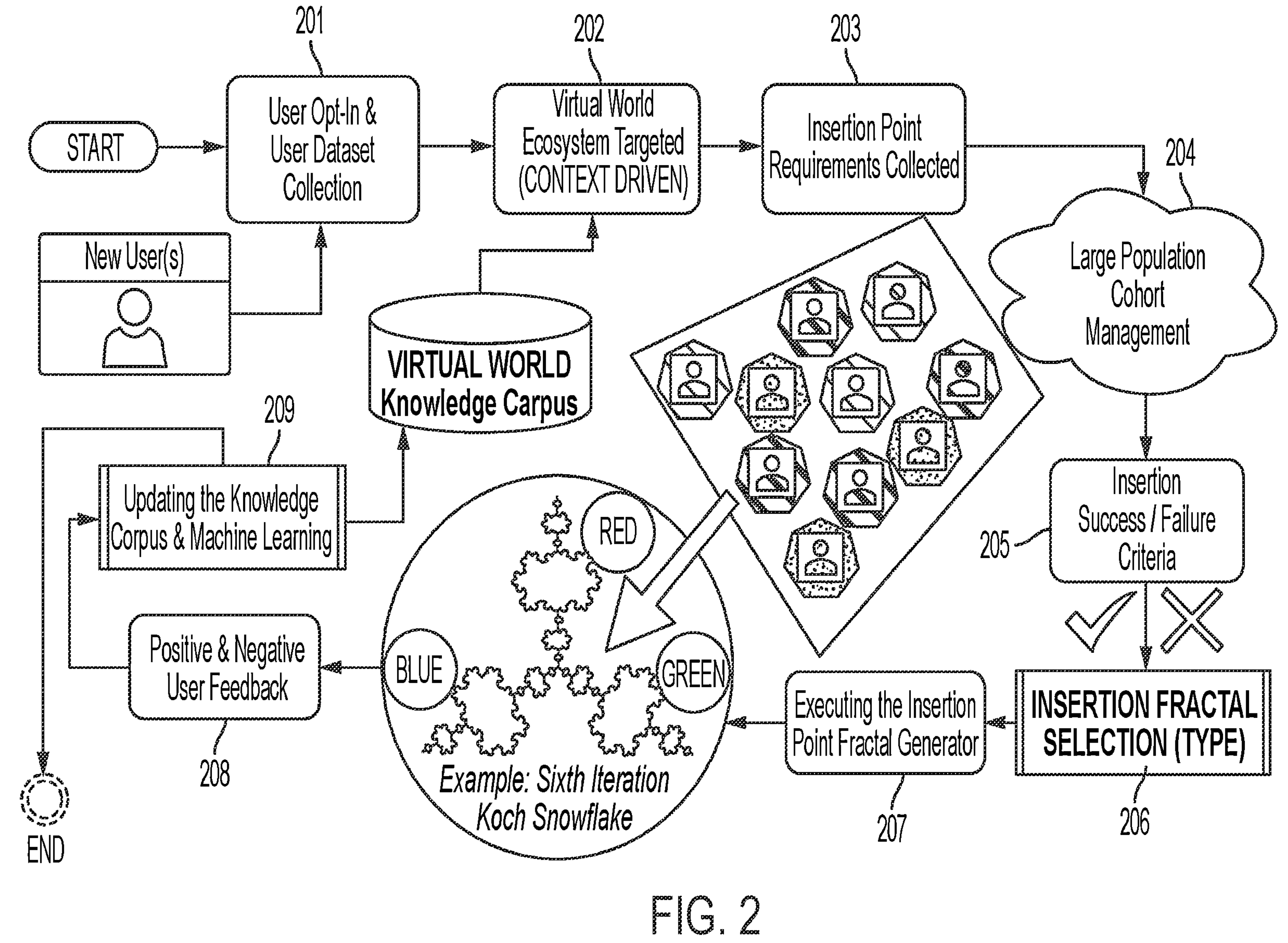
FIG. 2 is aa flowchart illustrating an operation of the computer-implemented method for virtual space insertion of FIG. 1 in accordance with one or more embodiments of the present invention.

With reference to FIG. 2, an operation of the computer-implemented method 100 of FIG. 1 is illustrated. As shown in FIG. 2, a user opts in and his/her user data is collected 201 before the user targets a virtual space 202. Insertion point requirements for the user are compiled from the user data 203 whereupon large population (i.e., the user and all of the other users) cohort management is executed 204. Insertion success/failure criteria are then developed 205 and a self-similar geometric insertion point pattern or fractal pattern is then selected and generated 206 whereupon the generation of the self-similar geometric insertion point pattern or the fractal pattern is executed 207. Feedback is received 208 and knowledge databases are updated for machine learning 209.

Figure 3:
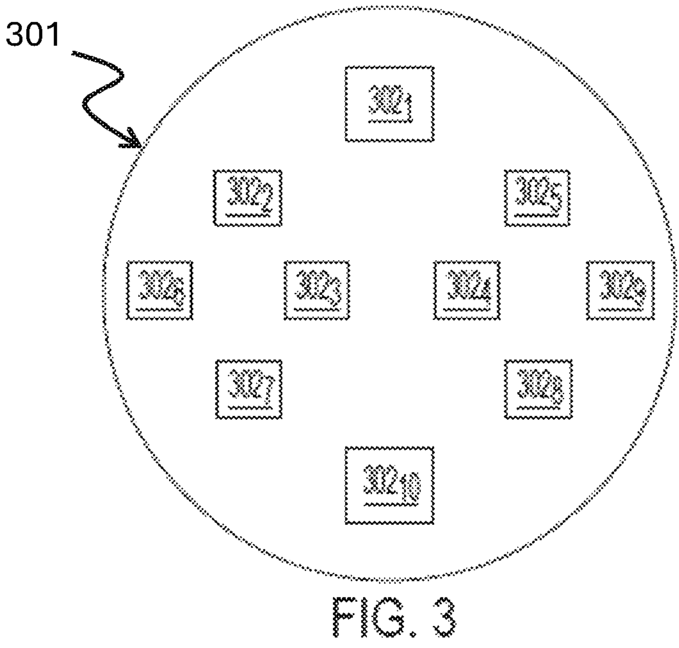
FIG. 3 is a graphical depiction of a virtual space in accordance with one or more embodiments of the present invention.
Figure 4:
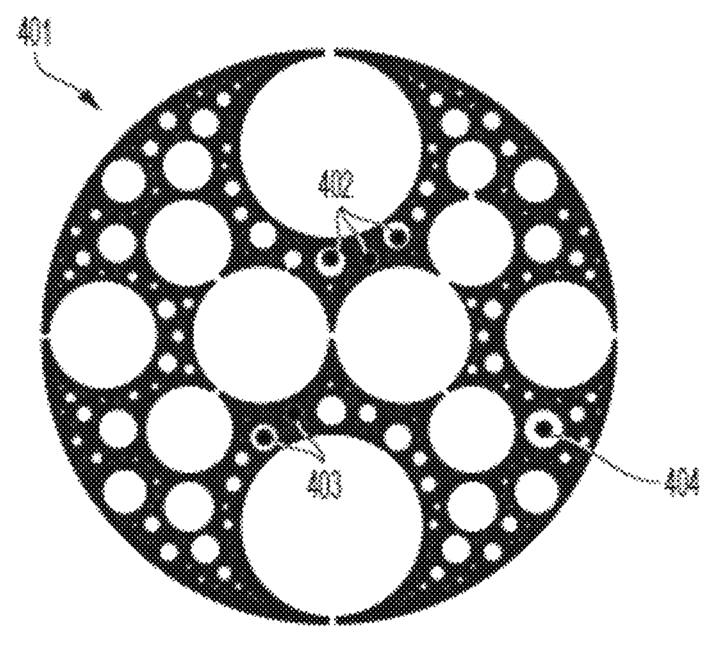
FIG. 4 is a graphical depiction of a self-similar geometric insertion point pattern that is compatible with the virtual space of FIG. 3 in accordance with one or more embodiments of the present invention.
Figures 5, 6:
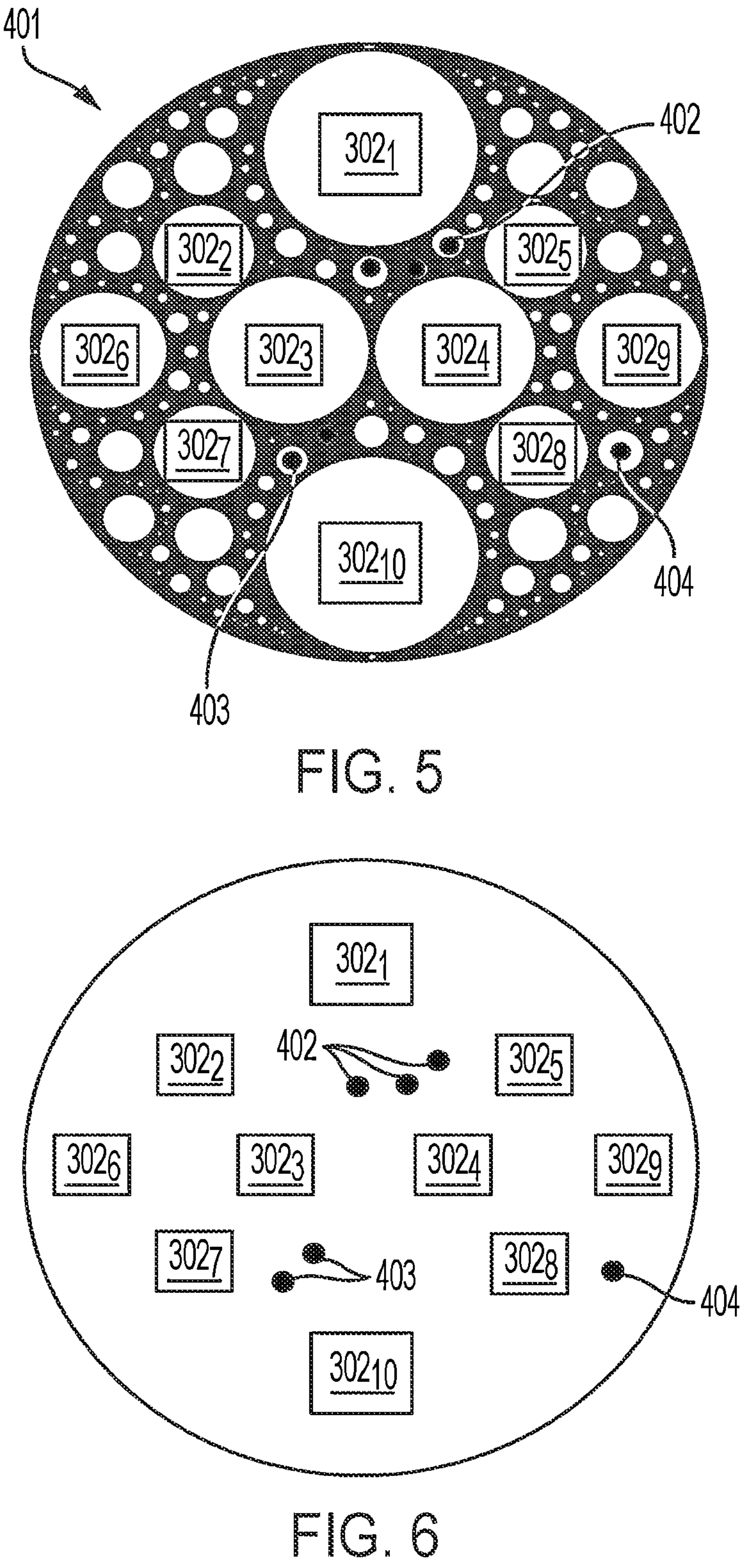
FIG. 5 is a graphical depiction of an overlay of the self-similar geometric insertion point pattern of FIG. 4 with the virtual space of FIG. 3 and insertion points in accordance with one or more embodiments of the present invention.
FIG. 6 is a graphical depiction of an overlay of the virtual space of FIG. 3 and insertion points in accordance with one or more embodiments of the present invention.

With reference to FIGS. 3-6, an instance of the computer-implemented method 100 will now be described. As shown in FIG. 3, a virtual space 301 is defined for a virtual technology expo and is targeted by users for entry. The virtual space 301 is arranged as a circular space with kiosks $\mathbf{302}_{1\text{-}10}$ arranged at various locations throughout the virtual space 301. The users targeting the virtual space 301 for entry opt in and provide their user data/metadata and preferences. From the user data/metadata and the preferences, insertion point requirements can be determined as it is apparent that the users include three users who are business associates and who wish to be inserted into the virtual space 301 together so they can interface with kiosk $\mathbf{302}_1$ together, two users who are particularly interested in kiosks $\mathbf{302}_3$, $\mathbf{302}_7$ and $\mathbf{302}_{10}$ and do not care who they are inserted near and one user who wants to be inserted alone and at an exterior of the virtual space 301. As shown in FIG. 4, a self-similar geometric insertion point pattern 401 is selected and generated using a self-similar geometric insertion point pattern or fractal generator. The self-similar geometric insertion point pattern 401 is designed to fit into the virtual space 301 and to accommodate the locations of each of the kiosks $\mathbf{302}_{1\text{-}10}$ to an optimal extent possible while also accommodating the insertion point requirements to an optical extent possible (i.e., to achieve compatibility to the first and second thresholds). Once the self-similar geometric insertion point pattern 401 is generated, insertion points 402 for the entry of each of the business associate users can be mapped to the self-similar geometric insertion point pattern 401, insertion points 403 for the entry of each of the two users who are particularly interested in kiosks $302_3$, $302_7$ and $302_{10}$ can be mapped to the self-similar geometric insertion point pattern 401 and an insertion point 404 for the entry of the user who wants to be inserted alone can be mapped to the self-similar geometric insertion point pattern 401. As shown in FIGS. 5 and 6, the virtual space 301, the kiosks $302_{1-10}$, the self-similar geometric insertion point pattern 401 and the insertion points 402, 403 and 404 can be overlayed together (FIG. 6 has the self-similar geometric insertion point pattern 401 removed for clarity) illustrating that the self-similar geometric insertion point pattern 401 is sufficiently compatible with the virtual space 301 and the insertion point requirements of the users.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
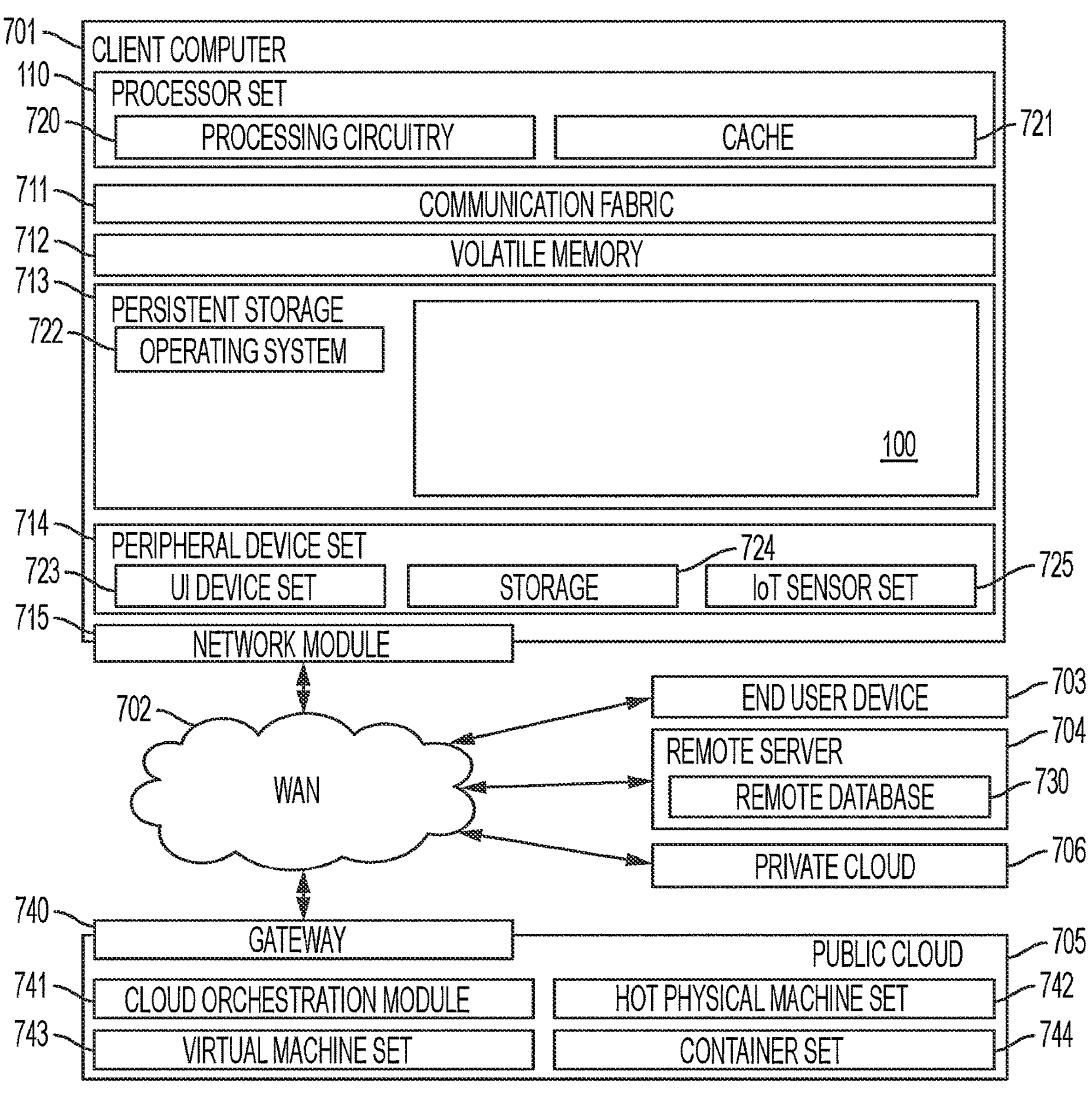
FIG. 7 is a block diagram of a computing environment operable to implement aspects of the invention.

With reference to FIG. 7, a computer or computing device 700 that implements the computer-implemented method 100 of FIG. 1 and FIGS. 2 and 3-6 in accordance with one or more embodiments of the present invention is provided. The computing system of FIG. 7 contains an example of an environment for the execution of at least some of the computer code involved in performing the inventive methods, such as the computer-implemented method for virtual space insertion 100 of FIG. 1. In addition to the computer-implemented method for virtual space insertion 100, the computing system 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and the computer-implemented method for virtual space insertion 100, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

The computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of the computer-implemented method for virtual space insertion 100, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

The processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In the computer-implemented method for virtual space insertion 100, at least some of the instructions for performing the inventive methods may be stored in the block of the computer-implemented method for virtual space insertion 100 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in the block of the computer-implemented method for virtual space insertion 100 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for virtual space insertion, the computer-implemented method comprising:

receiving, using a processor system, first and second user inputs from users regarding user information and regarding a virtual space targeted for entry by each of the users, respectively;

obtaining, using the processor system, spatial and occupancy information of the virtual space;

determining, using the processor system, insertion point requirements for the entry of each of the users into the virtual space from the first user inputs;

generating, using the processor system, a self-similar geometric insertion point pattern compatible with the insertion point requirements to a first threshold and with the spatial and occupancy information to a second threshold;

mapping, using the processor system, an insertion point for the entry of each of the users into the virtual space to the self-similar geometric insertion point pattern; and dynamically updating the self-similar geometric insertion point pattern as the users enter and exit the virtual space.

2. The computer-implemented method according to claim 1, wherein the user information for each of the users comprises at least one or more of:

user data;

user metadata;

insertion point pitch preferences;

distance or proximity preferences with respect to insertion points of other users;

distance or proximity preferences with respect to insertion points of specified users; and positional preferences with respect to the virtual space and sub-sections of the virtual space.

3. The computer-implemented method according to claim 1, wherein:

the spatial information of the virtual space comprises shape and dimension information of the virtual space, and the occupancy information describes a number of users present in the virtual space and concentrations of those users in the virtual space.

4. The computer-implemented method according to claim 1, wherein the self-similar geometric insertion point pattern comprises a fractal geometry.

5. The computer-implemented method according to claim 1, wherein:

the first threshold is a ratio of compatibilities between the self-similar geometric insertion point pattern and the insertion point requirements, and the second threshold is a ratio of compatibilities between the self-similar geometric insertion point pattern and the spatial and occupancy information.

6. The computer-implemented method according to claim 1, further comprising:

receiving user feedback regarding the insertion point for the entry of the user into the virtual space;

refining a configuration of the self-similar geometric insertion point pattern in accordance with the user feedback;

updating a database associating the configuration of the self-similar geometric insertion point pattern with the virtual space; and referring to at least the database during a subsequent generation of the self-similar geometric insertion point pattern for a new virtual space, which is similar to the virtual space.

7. A computer program product for virtual space insertion, the computer program product comprising one or more computer readable storage media having computer readable program code collectively stored on the one or more computer readable storage media, the computer readable program code being executed by a processor of a computer system to cause the computer system to perform a method comprising:

receiving first and second user inputs from users regarding user information and regarding a virtual space targeted for entry by each of the users, respectively;

obtaining spatial and occupancy information of the virtual space;

determining insertion point requirements for the entry of each of the users into the virtual space from the first user inputs;

generating a self-similar geometric insertion point pattern compatible with the insertion point requirements to a first threshold and with the spatial and occupancy information to a second threshold; and mapping an insertion point for the entry of each of the users into the virtual space to the self-similar geometric insertion point pattern, wherein the method further comprises:

receiving user feedback regarding the insertion point for the entry of the user into the virtual space;

refining a configuration of the self-similar geometric insertion point pattern in accordance with the user feedback;

updating a database associating the configuration of the self-similar geometric insertion point pattern with the virtual space; and referring to at least the database during a subsequent generation of the self-similar geometric insertion point pattern for a new virtual space, which is similar to the virtual space.

8. The computer program product according to claim 7, wherein the user information for each of the users comprises at least one or more of:

user data;

user metadata;

insertion point pitch preferences;

distance or proximity preferences with respect to insertion points of other users;

distance or proximity preferences with respect to insertion points of specified users; and positional preferences with respect to the virtual space and sub-sections of the virtual space.

9. The computer program product according to claim 7, wherein:

the spatial information of the virtual space comprises shape and dimension information of the virtual space, and the occupancy information describes a number of users present in the virtual space and concentrations of those users in the virtual space.

10. The computer program product according to claim 7, wherein the self-similar geometric insertion point pattern comprises a fractal geometry.

11. The computer program product according to claim 7, wherein:

the first threshold is a ratio of compatibilities between the self-similar geometric insertion point pattern and the insertion point requirements, and the second threshold is a ratio of compatibilities between the self-similar geometric insertion point pattern and the spatial and occupancy information.

12. The computer program product according to claim 7, wherein the method further comprises dynamically updating the self-similar geometric insertion point pattern as the users enter and exit the virtual space.

13. A computing system comprising:

a processor;

a memory coupled to the processor; and one or more computer readable storage media coupled to the processor, the one or more computer readable storage media collectively containing instructions that are executed by the processor via the memory to implement a method comprising:

receiving first and second user inputs from users regarding user information and regarding a virtual space targeted for entry by each of the users, respectively;

obtaining spatial and occupancy information of the virtual space;

determining insertion point requirements for the entry of each of the users into the virtual space from the first user inputs;

generating a self-similar geometric insertion point pattern compatible with the insertion point requirements to a first threshold and with the spatial and occupancy information to a second threshold; and mapping an insertion point for the entry of each of the users into the virtual space to the self-similar geometric insertion point pattern, wherein the method further comprises one of:

dynamically updating the self-similar geometric insertion point pattern as the users enter and exit the virtual space, and receiving user feedback regarding the insertion point for the entry of the user into the virtual space;

refining a configuration of the self-similar geometric insertion point pattern in accordance with the user feedback;

updating a database associating the configuration of the self-similar geometric insertion point pattern with the virtual space; and referring to at least the database during a subsequent generation of the self-similar geometric insertion point pattern for a new virtual space, which is similar to the virtual space.

14. The computing system according to claim 13, wherein the user information for each of the users comprises at least one or more of:

user data;

user metadata;

insertion point pitch preferences;

distance or proximity preferences with respect to insertion points of other users;

distance or proximity preferences with respect to insertion points of specified users; and positional preferences with respect to the virtual space and sub-sections of the virtual space.

15. The computing system according to claim 13, wherein:

the spatial information of the virtual space comprises shape and dimension information of the virtual space, and the occupancy information describes a number of users present in the virtual space and concentrations of those users in the virtual space.

16. The computing system according to claim 13, wherein:

the first threshold is a ratio of compatibilities between the self-similar geometric insertion point pattern and the insertion point requirements, and the second threshold is a ratio of compatibilities between the self-similar geometric insertion point pattern and the spatial and occupancy information.

* * * * *